US012767443B2

(12) United States Patent
Gebhardt

(10) Patent No.: US 12,767,443 B2
(45) Date of Patent: Oct. 20, 2026

(54) SHUTTLE SYSTEM AND METHOD FOR OPERATING A SHUTTLE SYSTEM

(71) Applicant: Gebhardt Fördertechnik GmbH, Sinsheim (DE)

(72) Inventor: Marco Gebhardt, Sinsheim (DE)

(73) Assignee: Gebhardt Fördertechnik GmbH, Sinsheim (DE)

( * ) Notice: Subject to any disclaimer, the term of this patent is extended or adjusted under 35 U.S.C. 154(b) by 315 days.

(21) Appl. No.: 18/593,456

(22) Filed: Mar. 1, 2024

(65) Prior Publication Data

US 2024/0294335 A1 Sep. 5, 2024

(30) Foreign Application Priority Data

Mar. 3, 2023 (DE) ......................... 102023105279.9

(51) Int. Cl.
*B65G 1/04* (2006.01)
*B65G 1/06* (2006.01)
*B65G 1/127* (2006.01)
*B65G 1/137* (2006.01)

(52) U.S. Cl.
CPC ........... *B65G 1/0492* (2013.01); *B65G 1/065* (2013.01); *B65G 1/127* (2013.01); *B65G 1/1376* (2013.01)

(58) Field of Classification Search
CPC ....... B65G 1/0492; B65G 1/065; B65G 1/127
USPC .......................................................... 414/284
See application file for complete search history.

(56) References Cited

U.S. PATENT DOCUMENTS

| | | | | |
|---|---|---|---|---|
| 4,932,607 A * | 6/1990 | Layton | B64G 5/00 414/679 |
| 5,294,078 A * | 3/1994 | Gurr | B64G 5/00 244/116 |
| 6,186,039 B1 * | 2/2001 | Mueller | F41F 3/04 89/1.805 |
| 10,294,026 B1 | 5/2019 | Lee | |
| 10,974,853 B1 * | 4/2021 | Burcar | B64G 5/00 |

FOREIGN PATENT DOCUMENTS

| | | |
|---|---|---|
| CA | 2937669 A1 | 1/2018 |
| CN | 114435833 A | 5/2022 |
| FR | 2919591 A1 | 2/2009 |

OTHER PUBLICATIONS

EP Search Report, EP24160349, dated Jul. 18, 2024 (w_translation).
German Office Action, DE 10 2023 105 279.9, dated Jan. 17, 2024 (w_translation).
Machine English translation of CN114435833.

* cited by examiner

*Primary Examiner* — Ahshik Kim
(74) *Attorney, Agent, or Firm* — Reising Ethington P.C.

(57) ABSTRACT

In a method for operating a shuttle system, shuttles may move automatically horizontally within rack levels in a normal operating mode, and can optionally change rack levels by means of a vertical conveyor. The vertical conveyor may convey the recovery vehicle into a transfer position in a recovery vehicle mode in order to allow the recovery vehicle to be used in an adjacent rack level.

14 Claims, 5 Drawing Sheets

SHUTTLE SYSTEM AND METHOD FOR OPERATING A SHUTTLE SYSTEM

CROSS-REFERENCE TO RELATED APPLICATION

This application claims priority to German Patent Application No. DE102023105279.9, filed on Mar. 3, 2023, the contents of which is hereby incorporated by reference in its entirety.

TECHNICAL FIELD

The present disclosure relates to a shuttle system and to a method for operating a shuttle system of this kind.

BACKGROUND

Shuttle systems and methods for operating said systems are known from the prior art.

Among other things, an object of the present disclosure is to address disadvantages of the prior art.

SUMMARY

Aspects and features of the present disclosure may address one or more challenges associated with the prior art.

A shuttle system according to the present disclosure comprises racking having a plurality of rack levels, the rack levels comprising guideways for shuttles. The shuttle system can be a pallet store, for example a channel pallet store.

The shuttle system can comprise at least one shuttle, preferably a plurality of shuttles, which can be moved within the rack levels on the guideways.

The guideways can be running rails, for example, which consist of a horizontally arranged grid consisting of intersecting running rails extending orthogonally to one another. The shuttles in the form of four-way shuttles can be configured to move horizontally as desired within the rack levels, in particular on the running rails. The shuttles can be constructed as pallet shuttles.

The shuttle system comprises at least one vertical conveyor, which is configured to convey a shuttle or load from a first rack level to a second rack level, i.e. from one rack level to another rack level. The load can be a pallet, for example.

The shuttle system further comprises at least one recovery vehicle, by means of which an operator can enter a rack level. The recovery vehicle is preferably in a normal operating mode when there is thus no incident of any kind and the recovery vehicle is not required to be permanently in a car (described in more detail below) of a vertical conveyor.

A recovery vehicle of this kind allows an operator to enter the rack levels which are usually only traversed by shuttles in a normal operating mode. The operator can then rectify a fault, for example.

Since it may be necessary for a recovery vehicle to be used on any rack level of the racking, by arranging the recovery vehicle in the car, a separate recovery vehicle does not have to be kept available on every rack level. Depending on the size of the racking and for example on a number of rack levels and/or storage spaces or the throughput of the shuttle system, one or two recovery vehicles may be sufficient for the entire shuttle system.

The vertical conveyor comprises a vertically extending frame and a car that is vertically movable along this frame. The frame is preferably stationary and can also be constructed in the form of a closed elevator shaft, or alternatively in the form of a mast or a plurality of masts or the like. In the context of the present disclosure, a frame is described as any, preferably stationary, structure along which the car can move vertically. The vertical conveyor is thus preferably a stationary vertical conveyor, the frame of which does not change position relative to the racking.

The car does not have to be closed. In the context of the present disclosure, the term "car" covers all the devices which can receive a load or a shuttle and a recovery vehicle and can move vertically along the frame.

The car comprises a first receiving portion for receiving a shuttle or load and a second receiving portion for receiving a recovery vehicle. The first receiving portion can serve to receive exactly one shuttle or load. The second receiving portion can serve to receive exactly one recovery vehicle. The receiving portions can be designed as platforms. The receiving portions can be predominantly or exclusively designed as running rails which, in a transfer position described in more detail in the following, can serve as a continuation of any running rails present in the rack levels. In particular when the first receiving portion does not receive any shuttles, but instead is intended to receive a load, it can also comprise or be formed by a horizontal conveyor, with telescopic forks, belt conveyors, roller conveyors, chain conveyors and the like being conceivable. The above-mentioned elements can collectively also be referred to as "active load-receiving means". Active load-receiving means of this kind are one of several conceivable configurations of a receiving portion.

In each case, the car can assume, with regard to at least two rack levels of the racking, a transfer position in which the first and/or the second receiving portion is substantially at an adjacent rack level such that a shuttle and/or a recovery vehicle can enter the adjacent rack level from the car or a load can be transferred in this direction, or a shuttle or a recovery vehicle can enter the car from the adjacent rack level or a load can be transferred in this direction.

If a shuttle and a recovery vehicle can be intended to enter the same adjacent level simultaneously, the first and the second receiving portion are expediently arranged beside one another.

In principle it would be conceivable, although less practical in most embodiments, not to arrange the first and the second receiving portion in the same car, but to configure them, in any form, as separate components that are arranged to be movable within the frame independently of one another.

A load can be transferred by means of a suitable, in particular active, load-receiving means, for example a telescopic fork. If, for example, a load positioned on the first receiving portion of the vertical conveyor is intended to be transferred to a shuttle waiting in the adjacent rack level, this can take place by the first receiving portion being designed as a telescopic fork.

Alternatively, a load can for example be transferred by the shuttle entering the car of the vertical conveyor. As already mentioned, corresponding running rails can be provided therein, with suitable set-down rails or the like also being able to be provided, on which the shuttle can set down the load, for example a pallet. After setting down the load, the shuttle can leave the vertical conveyor again, at which point the vertical conveyor conveys the load to the desired rack level.

If the vertical conveyor conveys shuttles vertically in order to enable a level change, the shuttle system is an unbound system. If, however, the vertical conveyor conveys loads vertically, it is a level-bound system. In level-bound systems, the shuttles do not change "their" level.

The vertical conveyor-facilitated level change of shuttles in an unbound system is sometimes also called roaming. One example of this so-called roaming may be that fewer shuttles are required than in level-bound systems, and that the flexibility of the unbound system is greater.

The shuttle system can comprise at least two vertical conveyors and at least two recovery vehicles. The shuttle system can also comprise exactly two vertical conveyors and exactly two recovery vehicles. A number of vertical conveyors can depend on a size, for example a number, of storage spaces in the shuttle system.

Each car preferably accommodates exactly one recovery vehicle. If at least two vertical conveyors and at least two recovery vehicles are provided, there is advantageous redundancy with regard to both components: if a vertical conveyor fails or a recovery vehicle is defective, there is a second vertical conveyor and a second recovery vehicle available, respectively.

The second receiving portion can be arranged above the first receiving portion. Alternatively, the second receiving portion can be arranged beside the first receiving portion, behind the first receiving portion, or below the first receiving portion.

If the two receiving portions are arranged above one another, their vertical distance can be minimized to the extent that sufficient space is provided vertically for the load or the shuttle and the recovery vehicle, but there is not unused empty space in the vertical direction.

Alternatively, the distance can be selected such that, in a transfer position, the receiving portion arranged in the car at the top allows for a transfer with an adjacent rack level, i.e. for example the exit of the recovery vehicle, and the receiving portion arranged in the car at the bottom allows for a transfer with an adjacent rack level positioned therebelow, i.e. for example the exit of the shuttle. This kind of configuration of the car does, however, usually mean that unused empty space remains above the shuttle or above the load and/or above the vertical conveyor, i.e. an extent of the car in the vertical direction (i.e. its height) is greater than is absolutely necessary. At the same time, however, this kind of configuration of the car can simplify control of the vertical conveyor and operation of corresponding sensors, etc. For instance, just one of the receiving portions needs to be positioned correctly in relation to an adjacent rack level at any one time, for example, since the other receiving portion is automatically correctly positioned in relation to the rack level positioned thereabove or therebelow.

The receiving portions can also be arranged to be vertically offset, namely either beside one another or behind one another. If the receiving portions are arranged behind one another, the second receiving portion for the recovery vehicle can be arranged in the car so as to be further from the rack, since it is used less frequently than the first receiving portion.

The shuttle system can comprise at least one rack-side barrier, which can assume an open and a closed position, the barrier allowing a shuttle to enter the first receiving portion of the vertical conveyor from a rack level in the open position when the vertical conveyor is in the transfer position, and the barrier preventing the shuttle from entering in the closed position.

A rack-side barrier of this kind can prevent a shuttle or a recovery vehicle coming out of a rack level from unintentionally or accidentally entering and falling into the frame, for example the elevator shaft. At the same time, the rack-side barrier can cause a shuttle or a recovery vehicle located in the transfer position to enter the adjacent rack level only in a controlled manner, because, before entering, the rack-side barrier has to be brought into the open position.

A rack-side barrier can be arranged at each passage between a rack level and the adjacent frame at which a shuttle or the like can enter the car in the transfer position. All the passages of the shuttle system between the vertical conveyor and one of the rack levels are preferably equipped with a rack-side barrier of this kind.

A rack-side barrier of this kind can be attached to a structure of the racking in any way.

The rack-side barrier can be constructed as a passive barrier which does not comprise an actuator and cannot be actively actuated. Alternatively, the rack-side barrier can be actively actuated, for example can comprise an actuator, which can bring about a movement from the open position into the closed position and back again.

The vertical conveyor can comprise an actuation device which can move the rack-side barrier from the closed position into the open position and from the open position into the closed position.

An actuation device arranged in the vertical conveyor, for example in the car, can result in a simple construction and robust, reliable functionality, since the rack-side barriers do not require any actuators in this variant and do not need to be individually actuated. Instead of actuators at each passage to the vertical conveyor and thus at each rack level, a single actuation device in the car or in the vertical conveyor can be sufficient.

The actuation device can bring about the opening of the rack-side barrier purely mechanically. Other mechanisms of action are also conceivable.

Alternatively, an above-described control-engineering solution comprising corresponding actuators or the like at each rack-side barrier is still conceivable.

Additionally or alternatively, the shuttle system can further comprise a vertical-conveyor-side barrier, which can assume an open and a closed position, this barrier allowing a shuttle and/or a recovery vehicle to enter a rack level from a first receiving portion of the vertical conveyor in the open position when the vertical conveyor is in the transfer position, and the barrier preventing the shuttle and/or the recovery vehicle from entering in the closed position. The vertical-conveyor-side barrier located on the vertical conveyor can either reversibly block both receiving portions or two vertical-conveyor-side barriers of this kind can be provided, with at least one barrier of this kind being assigned to each receiving portion. It is also conceivable for just one of the two receiving portions to comprise a vertical-conveyor-side barrier of this kind.

Similarly to the rack-side barrier, the vertical-conveyor-side barrier also prevents an unintentional or accidental transfer, i.e. a shuttle or recovery vehicle moving off towards the racking when the car is not in the transfer position, for example. Without this vertical-conveyor-side barrier, material damage to the shuttle and recovery vehicle and personal injury could occur.

Both the rack-side and the vertical-conveyor-side barriers can also at least be operated manually. It is also conceivable for the barriers to be operated by an actuator or to be configured to be active in some other way, for example, but to additionally be able to be actuated by physical strength where necessary. This ensures that an operator can manually open the barrier where necessary, since most of the barriers are closed in the normal operating mode. In the normal operating mode, the barriers provided are preferably only opened then and only for long enough for a transfer to take place, for example for a shuttle to enter the receiving portion from the adjacent rack level within the car.

In particular those vertical-conveyor-side barriers which prevent the inadvertent exit of the recovery vehicle can also or exclusively be operated manually, i.e. by physical strength. Therefore, control-based faults are prevented, since it is only possible for the recovery vehicle to exit if the corresponding operator manually opens the above-mentioned barrier. The vertical-conveyor-side barrier which prevents the shuttle from exiting in an undesired manner is, however, preferably opened and closed by an actuator.

If at least one vertical-conveyor-side barrier is provided, this is preferably fastened to the car. This means that only one or two barriers of this kind are required for each vertical conveyor.

The shuttle system can comprise both vertical-conveyor-side barriers and rack-side barriers. According to exemplary embodiments of the present disclosure, however, it may be sufficient to assign a rack-side barrier to each passage, and to dispense with vertical-conveyor-side barriers.

In the context of the present disclosure, those barriers which are arranged close to the passage and are potentially even arranged within the frame of the vertical conveyor are referred to as being "rack-side" barriers. In particular, a rack-side barrier of this kind is located in the region of each passage at each rack level. These rack-side barriers can be fastened to or between the running rails, which likewise can project into the frame to a certain extent from the rack level. By contrast, in the context of the present disclosure, those barriers which are fastened to the car are preferably considered to be "vertical-conveyor-side" barriers.

The shuttle system can comprise a vertical-conveyor-side bridging device which bridges a gap that is present in the transfer position between the receiving portion and the adjacent rack level in order to make it possible to transfer the shuttle and/or the recovery vehicle.

The bridging device can be arranged on the car.

For example, the bridging device can be a device which shifts the receiving portion in question towards the rack level in order to bridge the gap. It can therefore be a shifting device.

Alternatively, for example, the car can comprise telescopic elements, or elements that can be lengthened or extended in another way, which bridge the gap. For example, these can be extendable, fold-down or accordingly pivotable running rails which, for example, connect running rails serving as the receiving portion to the running rails of the adjacent rack level.

As a further alternative, the bridging device can be arranged on the rack. Again, however, a bridging device would then be required at each passage between the rack level and the vertical conveyor.

It is also conceivable to integrate the bridging device in the rack-side barrier or the vertical-conveyor-side barrier. The relevant barrier can comprise a small portion of the running rails, for example, and can thus be similar in design to a bascule railway bridge. In the closed state, a barrier of this kind prevents a shuttle and a recovery vehicle from making an accidental transfer. In the open position, a barrier of this kind bridges the gap between the racking and the vertical conveyor.

In all the variants of all the above-described barriers, they can comprise a return device, for example a spring or another energy accumulator element. The return device can preferably cause the barrier to be in the closed position, in particular by applying an accordingly directed restoring force to the barrier. When the barrier is actuated by an actuator or an actuation device and when it is actuated manually, the restoring force can be overcome. However, once a return device, an actuation device or an operator is no longer applying a force acting counter to the restoring force to the barrier in order to bring the barrier into the open position or keep it in this position, the barrier closes automatically owing to the return device that is preferably provided.

All the above-mentioned variants can allow for a safe transfer of the shuttle and/or the recovery vehicle. A transfer is understood to be a movement of the shuttle and/or the recovery vehicle from the receiving portion within the car into the adjacent rack level, or back again.

If the gaps are very narrow, exemplary embodiments of the shuttle system without a bridging device are conceivable. Even if the shuttles and/or recovery vehicles comprise a large number of wheels arranged in series or have other features or properties which make it possible to safely cross the gap, for example, the bridging device can be dispensed with.

Recovery vehicles and/or shuttles comprising eight wheels, for example, can be capable of negotiating a gap without a bridging device if the dimensions and nature of the wheels and the width of the gap allow it.

The above-mentioned actuation device and the above-mentioned bridging device can be part of the same device. The bridging device can alternatively act as or comprise the actuation device. Both situations are applicable in particular when the bridging device is arranged on the vertical-conveyor side.

This kind of combination of bridging device and actuation device can result in a simple and cost-effective construction, since two functions are implemented in one component.

A shuttle system comprising a rack-side barrier, an actuation device and a vertical-conveyor-side barrier as described above can be configured such that, in the transfer position, the actuation device can move both the vertical-conveyor-side barrier and the adjacent rack-side barrier from the closed position into the open position and from the open position into the closed position. The actuation device can be any suitable actuator. It can also be part of the bridging device, for example a portion thereof, or can be the bridging device itself.

If only rack-side barriers are provided, the shuttle system can be configured such that, in the transfer position, the actuation device can move the rack-side barrier from the closed position into the open position and from the open position into the closed position.

If rack-side and vertical-conveyor-side barriers are provided, they are preferably arranged at substantially the same height in the transfer position. Since, for the purpose of the transfer, when a shuttle is to enter the adjacent rack level from the car, for example, both of these barriers need to be opened simultaneously, it is advantageous for the actuation device to operate both barriers, preferably simultaneously or substantially simultaneously. Potential costs for multiple devices for opening the individual barriers are avoided by means of an actuation device responsible for both barriers.

Depending on the arrangement of the receiving portions and a clear height above the receiving portions, as well as a position of the lowermost rack level, it may be necessary to provide a cavity which the car of the vertical conveyor can enter. If the dimensions require such a design, this can allow a shuttle and/or a recovery vehicle located in the car to enter the lowermost rack level.

In addition to the above-described shuttle system, the present disclosure also comprises the method described below. Features and details which have been described above in relation to the system also apply to the method described below, and vice versa.

A method for operating an above-described shuttle system has a normal operating mode and a recovery vehicle mode. In the normal operating mode, automatic operation preferably prevails, which is e.g. controlled by a controller, for example a warehouse controller. Optionally, the shuttles can also operate partially or largely fully autonomously by communicating with vertical conveyors, other shuttles or other components of the shuttle system, for example, and/or by moving partially or largely fully autonomously by means of on-board technology such as sensors.

In the normal operating mode, the shuttles move automatically horizontally within the rack levels and optionally change the rack levels by means of the vertical conveyor. Alternatively, in the normal operating mode, the shuttles can automatically use the vertical conveyors to transfer loads to the vertical conveyors or to take loads therefrom.

In the recovery vehicle mode, the vertical conveyor conveys the recovery vehicle into a transfer position in order to allow the recovery vehicle to be used in the adjacent rack level.

A transition into the recovery vehicle mode preferably interrupts the normal operating mode within the entirety of the racking or within at least one portion of the racking. In any case, the normal operating mode is preferably interrupted in that/those vertical conveyor(s) which is/are intended to transport the recovery vehicle(s) to be used to the rack level in which the fault to be rectified is found.

The recovery vehicle mode can be started automatically or upon request, i.e. by any input from an operator. For example, a sensor can identify a fault within the shuttle system, for example a faulty shuttle or loads that have fallen down. Furthermore, the warehouse controller may report a fault when a faulty sequence within the shuttle system is identified. Preferably, however, a switch to the recovery vehicle mode requires at least the cooperation of an operator. This can be an input such as the press of a button or the like, or opening a door that is closed in the normal operating mode, which is tantamount to an implicit request. Alternative actions by an operator which bring about or contribute to bringing about the switch to the recovery vehicle mode are conceivable. It is also conceivable for a recovery vehicle mode to be started just by one action, for example a request by an operator. For example, an action can be the actuation of an operating element, for example a switch or the like. Alternatively, at least one monitored door can be assigned to the vertical conveyor, said door being opened by an operator constituting the above-mentioned action.

In general, it is conceivable for a maintenance platform, which can be reached by a ladder, to be assigned to the vertical conveyor, for example. Furthermore, it is conceivable for maintenance platforms to be arranged at different heights along the vertical conveyor, with an operator being able to reach the maintenance platforms via steps, for example, and, from there, the recovery vehicle located in the car. Here, it is conceivable for a monitored door to be arranged either before the entry point to the ladder or steps or between each maintenance platform and the vertical conveyor.

The recovery vehicle mode does not have to affect the entire shuttle system. If, for example, there is a fault in a certain rack level, only this rack level or a portion of this rack level in which the load that has fallen down is located, for example, can be put into the recovery vehicle mode. Preferably, a vertical conveyor that is close to the load that has fallen down, for example, is also put into the recovery vehicle mode, while other vertical conveyors, in particular those that are further away, can remain substantially in the normal operating mode. The rest of the rack levels, in which there is no fault, can remain substantially in the normal operating mode.

Alternatively, it is conceivable for the entire shuttle system not to be put into the recovery vehicle mode, but still more than just the rack level affected by the fault. For example, one or two adjacent rack levels located above and/or below the rack level affected by the fault can be completely or partially put into the recovery vehicle mode. Which adjacent rack levels and how many of them are put into the recovery vehicle mode can depend on a configuration of the racking, for example also on a vertical distance between the rack levels. For example, it is specifically conceivable to put the rack levels located immediately above and immediately below into the recovery vehicle mode at least in portions, in addition to the rack level affected by the fault.

If the shuttle system comprises at least two recovery vehicles and at least two vertical conveyors, following a request for a recovery vehicle for a rack level, two vertical conveyors convey two recovery vehicles to the level of the rack level according to the request. If, for example, a first operator enters a rack level in which e.g. a fault is intended to be rectified in a first recovery vehicle, and this first operator has an accident in the first recovery vehicle, encounters a medical problem (heart attack, stroke, etc.), or needs a second operator in the rack level in question for any other reason, the second recovery vehicle is always available. A second operator can then enter the rack level as soon as the medical problem occurs without delay, for example, in order to assist or rescue the first operator.

Rack levels or portions of rack levels which are in the recovery vehicle mode are preferably no longer actuated by shuttles, and any shuttles already located therein are preferably stopped or are directed to a charging station located outside the region in the recovery vehicle mode or to another location, for example.

In order to put the regions in question back into the normal operating mode from the recovery vehicle mode, an input by an operator may be required. Furthermore, in particular in addition, it is conceivable for these regions to only return to the normal operating mode when corresponding sensors or the like have established that the recovery vehicle previously located in the racking has entered the car of the vertical conveyor again.

The shuttle system can be controlled in a substantially automated manner by a warehouse controller in the normal operating mode. After a transition into the recovery vehicle mode, the warehouse controller can optionally initiate processing of all the level changes or at least some of the remaining level changes by means of the vertical conveyor. In this way, once the recovery vehicle mode is terminated and there has been a transition back to the normal operating mode, this mode can be started seamlessly, without stopped or paused tasks pending for processing and possibly causing faults. Any regions of the racking or shuttle system that have not been put into the recovery vehicle mode can remain in the normal operating mode in the meantime.

After a transition into the recovery vehicle mode, those shuttles of which the power storage unit falls below a certain lower limit and which require a level change for themselves or their load are moved to a charging station in the rack level in question, or switch to an energy-saving mode, or carry out another task that does not required any level change. In order to carry out another task, it may be necessary to set down an already received load again at the original location or place it in temporary storage at a suitable location. The above-mentioned measures can prevent a power storage unit of a shuttle falling below a critical limit or even becoming completely empty.

Known rechargeable batteries or capacitors, for example, come into consideration as power storage units for the shuttles.

It is conceivable to charge a power storage unit of a shuttle and/or recovery vehicle in the vertical conveyor. For this purpose, the vertical conveyor can for example comprise a suitable charging point, in particular within the car. Although the recovery vehicle is preferably solely manually operated and does not require a power storage unit for its own drive, it is often used to at least partially charge shuttles which have an empty power storage unit. By means of this step and the charging point, it can for example be ensured that, in the event of faults that last longer, a shuttle that has entered the car does not break down in the vertical conveyor due to an empty rechargeable battery or, generally, an empty power storage unit.

The shuttles and the vertical conveyors can comprise communication devices. For example, shuttles can request the car of the vertical conveyor when they are close to or at the passage between the rack level and the vertical conveyor and require conveyance to another rack level, either for the received load or for themselves.

The shuttle system can comprise a known central warehouse controller, which for example can assign tasks to the shuttles and monitors the shuttle system for faults.

The vertical conveyor can comprise a boom for lowering an injured operator to safety.

The vertical conveyor can comprise a removal opening. This is preferably arranged at ground level, such that an operator can remove the shuttle or the recovery vehicle from the car.

BRIEF DESCRIPTION OF THE DRAWINGS

Further advantages, features and details of the disclosure will become clear from the following description of preferred exemplary embodiments with reference to the drawings, in which.

DETAILED DESCRIPTION

Figure 2:
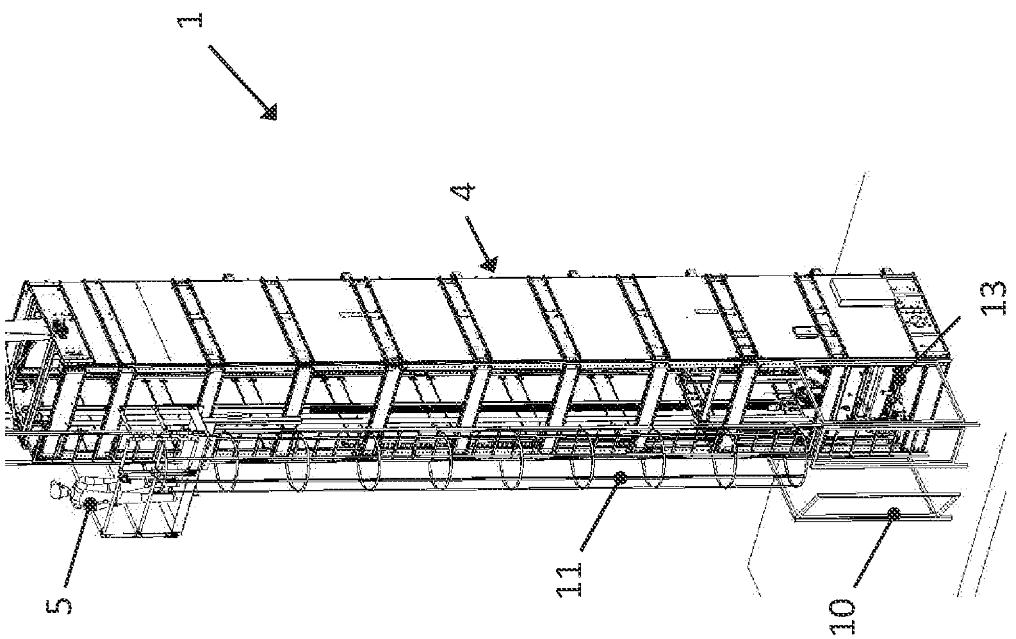
FIGS. 1 and 2 are a front and a rear view, respectively, of a vertical conveyor 1 according to an exemplary embodiment of the present disclosure.
Figure 1:
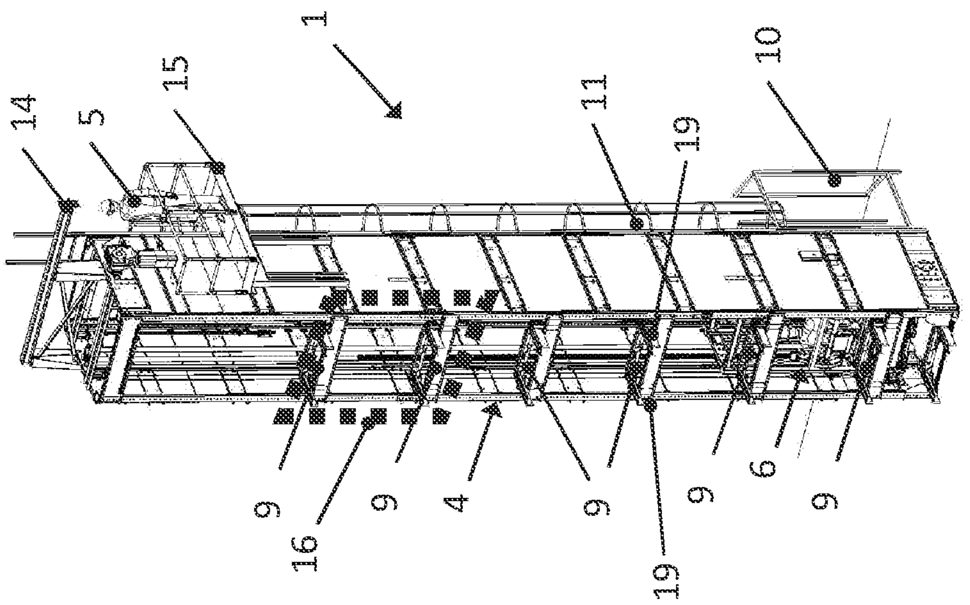

FIGS. 1 and 2 show a vertical conveyor 1 comprising a frame 4 and a car 6. A ladder having fall protection 11 and an operator 5 at the top of the vertical conveyor 1 are also shown, as well as a monitored door 10. A passage 16 is shown which leads from the frame 4 of the vertical conveyor 1 into the adjacent rack level (not shown in FIG. 1) of the racking 17.

Figure 3:
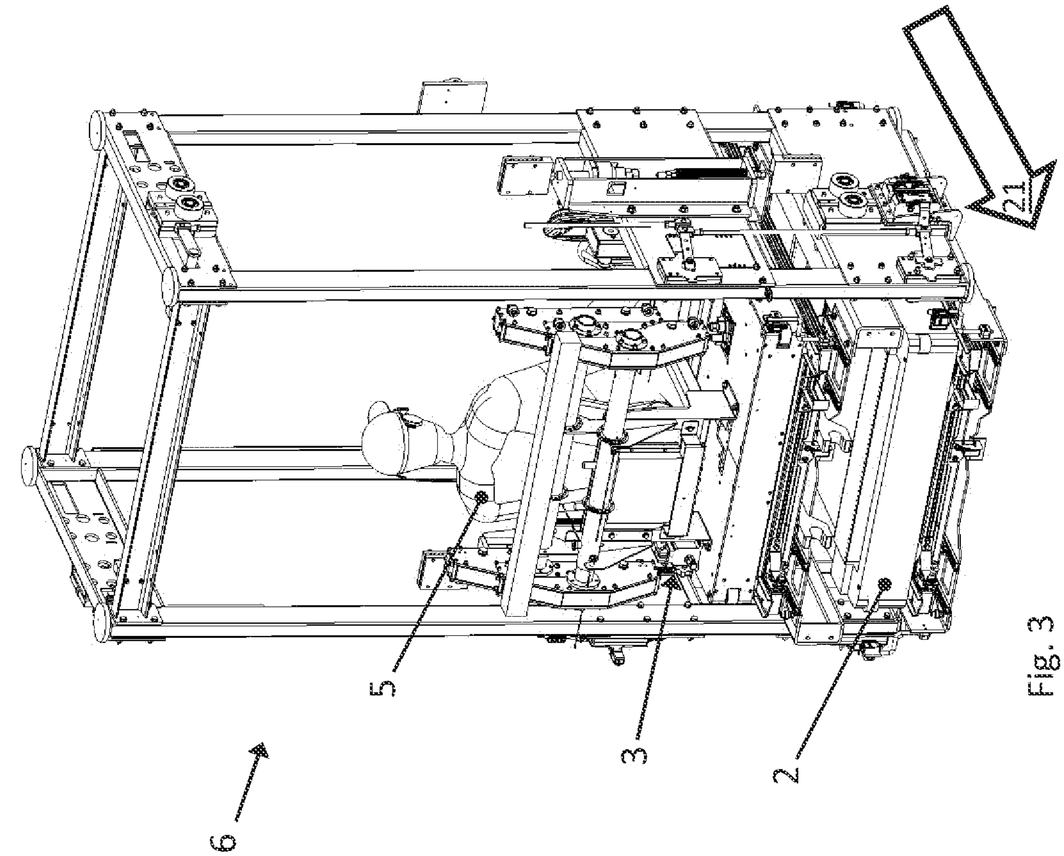

FIG. 3 shows an operator 5 on a recovery vehicle 3. In the arrangement according to FIG. 3, the operator 5 is ready to enter the racking 17 in the recovery vehicle 3. A shuttle 2 is visible below the recovery vehicle 3.

Figure 4:
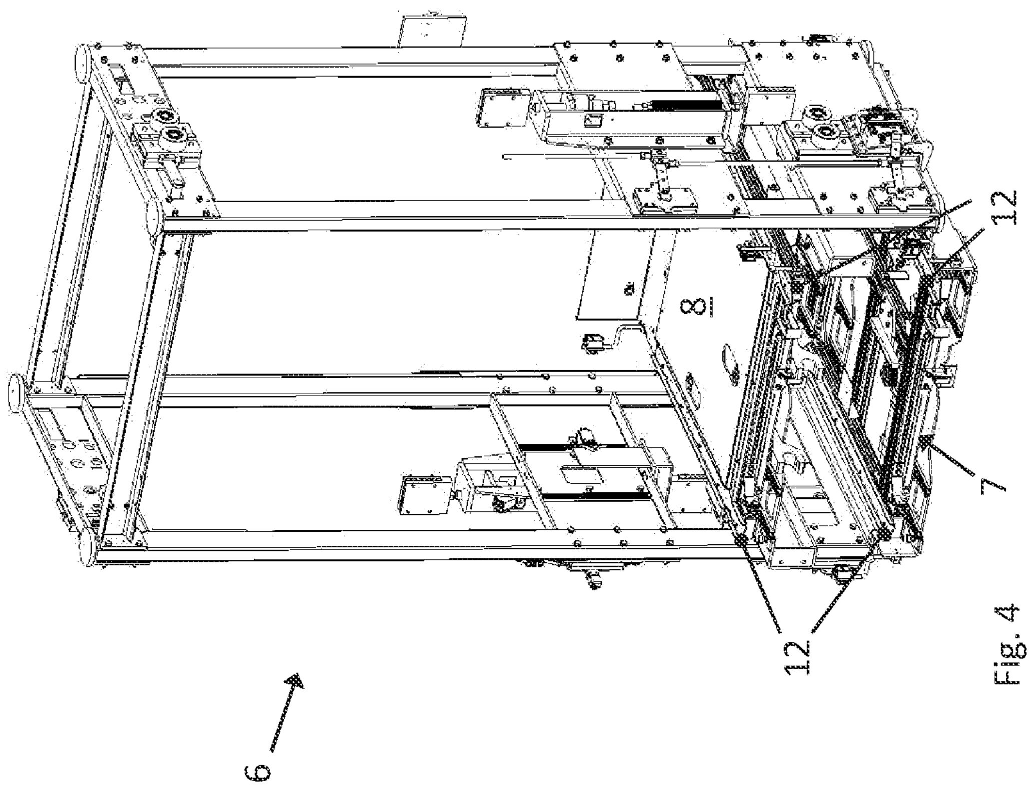
FIGS. 3 and 4 show a car 6 of a vertical conveyor 1 according to the present disclosure in a loaded and unloaded state.

FIG. 4 shows a first receiving portion 7 comprising two rails 12 and a second receiving portion 8 comprising two rails 12 located thereabove.

Figure 6:
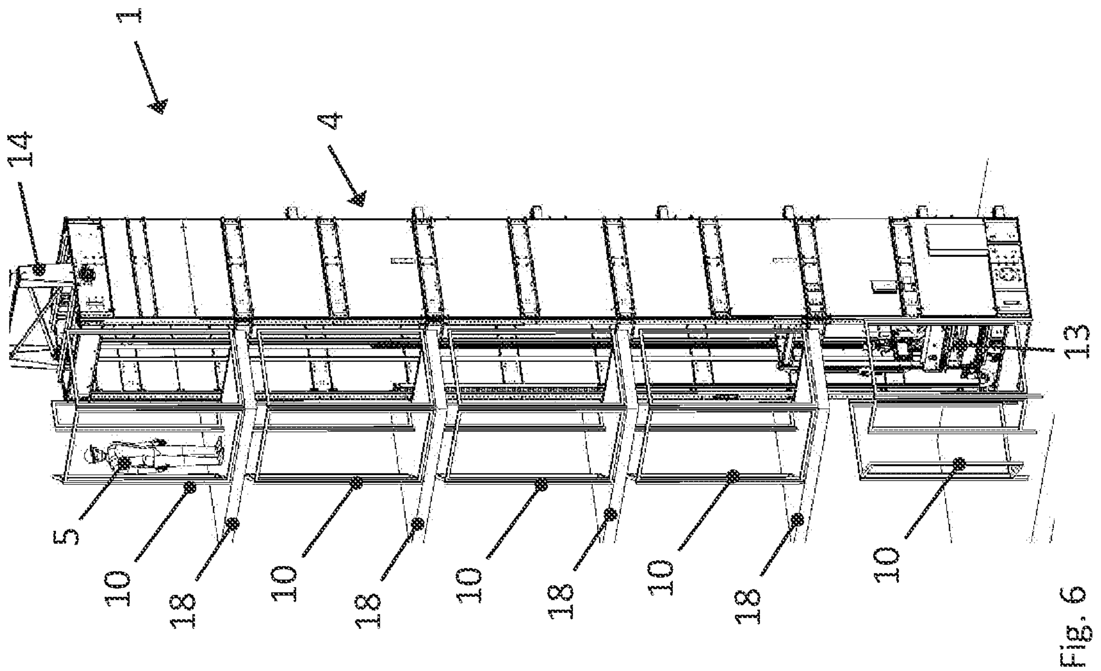
FIGS. 5 and 6 are a front and a rear view, respectively, of a vertical conveyor 1 according to a further exemplary embodiment of the present disclosure.
Figure 5:
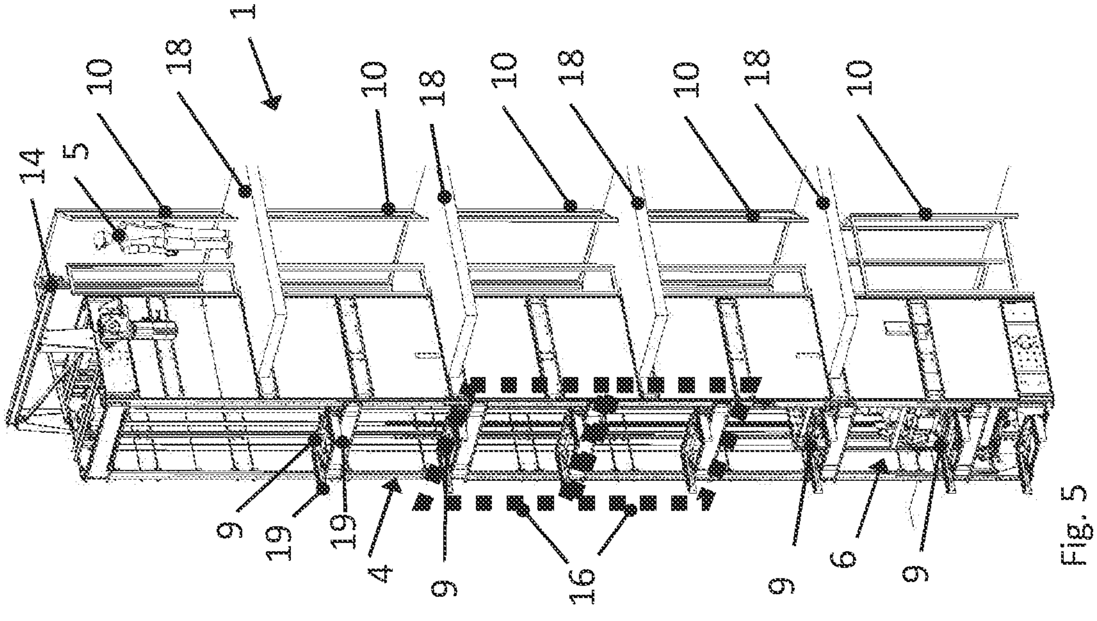

FIGS. 5 and 6 show an alternative to the vertical conveyor 1 according to FIGS. 1 and 2 in a front view and a rear view, respectively. Instead of the ladder 11, the vertical conveyor 1 shown in FIGS. 5 and 6 comprises maintenance stages 18. The maintenance stages 18 can be permanently installed steel structures that are immediately adjacent to the vertical conveyor 1. The maintenance stages 18, which are positioned to be higher, can be reached by steps (not shown). The maintenance stages 18 according to FIGS. 5 and 6 can be designed similarly to the maintenance platform 15 according to FIGS. 1 and 2. A monitored door 10 is located at the level of each maintenance stage 18. Furthermore, FIG. 5 indicates two of the provided passages 16.

For the sake of improved clarity, in particular when there are features provided multiple times, not all of these features are provided with reference numerals in the drawings. For example, only some of the passages 16 are provided with reference numerals in FIGS. 1 and 5. The same applies to the rack-side barriers 9 and the running rails 19 located in the racking 17.

Figure 8:
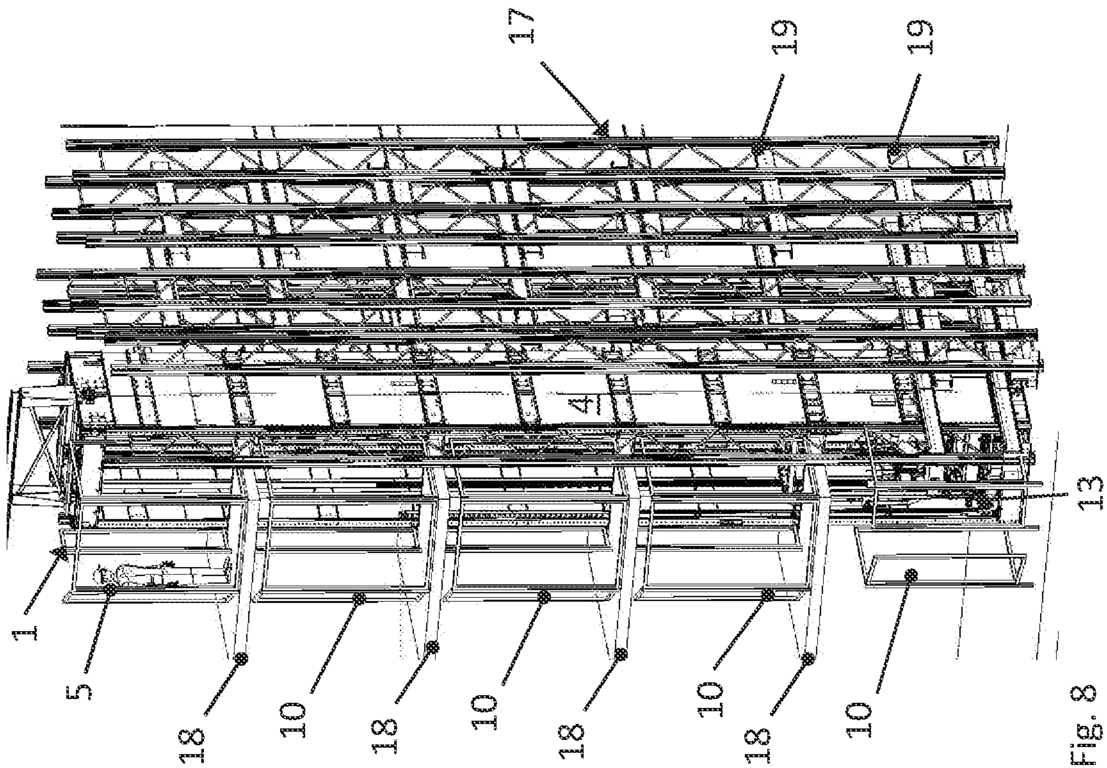
FIG. 8 is a view according to FIG. 6 with adjacent racking 17 shown in a detail.
Figure 7:
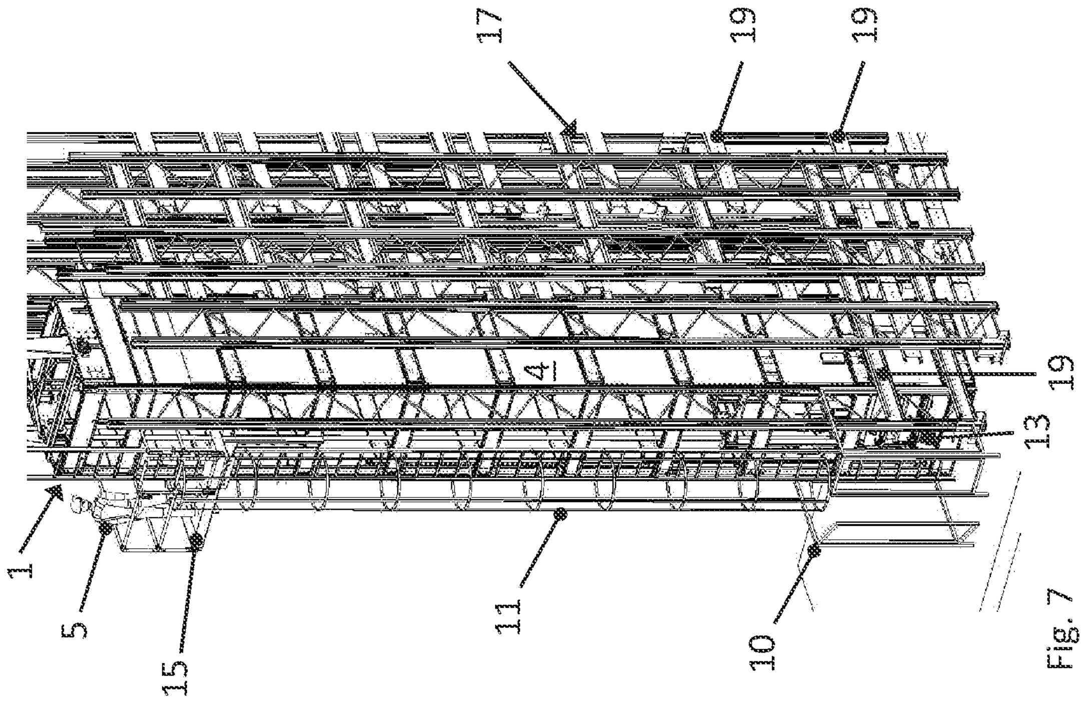
FIG. 7 is a view according to FIG. 2 with adjacent racking 17 shown in a detail.

For the sake of improved clarity, the racking 17 to which the vertical conveyor 1 is adjacent is not shown in the embodiments in FIGS. 1 and 2, or FIGS. 5 and 6. FIGS. 7 and 8 each show a small part of the racking 17. For one thing, it can be seen how the racking 17 also laterally surrounds the vertical conveyor 1 in order to utilize the available space. Furthermore, at least in comparison with FIGS. 1, 2, 5 and 6 it can be seen that the racking 17 adjoins the vertical conveyor 1 via the passages 16 thereof.

FIGS. 7 and 8 indicate some of the running rails 19 of the racking 17.

A position of the transitions 16 indicated in FIG. 1 is not explicitly marked in FIGS. 7 and 8 for the sake of improved clarity. A gap between one of the receiving portions 7, 8 and the running rails 19, which gap is in the boundary region between the racking 17 and the vertical conveyor 1 in the transfer position, is not specifically marked in FIGS. 7 and 8 for the sake of improved clarity.

Figure 9:
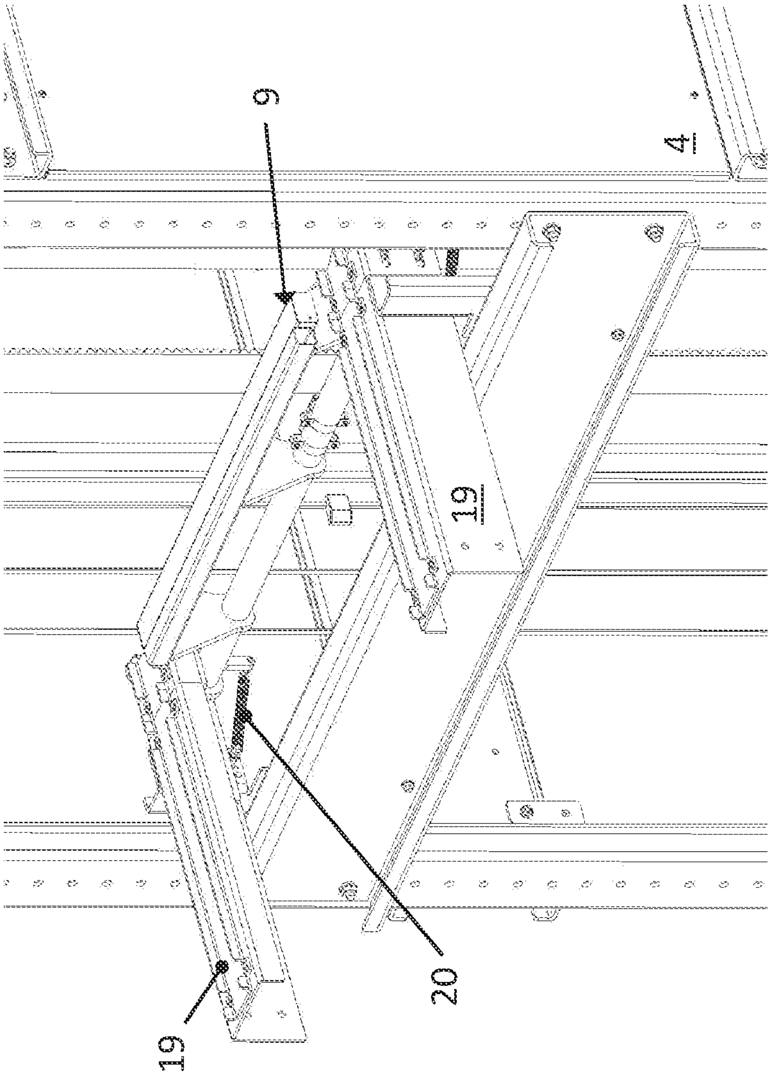
FIG. 9 shows a detail of a frame 4 having a rack-side barrier 9.

FIG. 9 is an enlarged view of a detail according to FIGS. 1 and 5. The vertical conveyor 1 according to FIGS. 1 and 5 are constructed identically on the side on which the passages 16 are located. FIG. 9 shows a rack-side barrier 9 comprising a return spring 20. Furthermore, details of the running rails 19 projecting into the adjacent rack level (not shown) can be seen.

FIG. 9 also shows that the rack-side barrier 9 which is immediately adjacent to the running rails 19 extending in the racking 17 is indeed located spatially within the frame 4 of the vertical conveyor 1, but is still correctly referred to as being "rack-side".

With reference to FIGS. 1 to 8, the functionality of the shuttle system according to the disclosure is explained as follows:

In the normal operating mode, the vertical conveyor 1 conveys shuttles 2, which are intended to change the rack level from a first rack level to a second, i.e. a different, rack level. In the embodiment in FIGS. 1 and 5, a rack-side barrier 9 and a passage 16 are assigned to each rack level. In order to make it possible to transfer the shuttle 2 from the rack level into the first receiving portion 7 or vice versa, the running rails 19 of the adjacent rack level, which are only indicated in FIGS. 1 and 5, and the rails 12 of the first receiving portion 7 are arranged to be flush or at least aligned. This position of the car 6, which allows for a transfer, is referred to as the transfer position.

It is conceivable for a sensor (not shown) of the shuttle 2, which is present as an on-board means, identifies the rack-side barrier 9 and stops the shuttle 2. It is therefore only possible for the shuttle 2 to enter the rack level via the running rails 19 when this barrier 9 is opened, for example by means of an actuator (not shown), i.e. when it has been moved downwards by being rotated, as in FIG. 9. Here, an actuator can be assigned to each rack-side barrier 9, or, alternatively, an actuator of this kind can be assigned to the car 6. The return spring 20 ensures that the barrier 9 is in the closed position, shown in FIG. 9, as long as an actuator is not acting on it.

During the vertical movements of the car 6 in the normal operating mode, the recovery vehicle 3 is always located on the rails 12 of the second receiving portion 8. The operator 5 only boards the recovery vehicle 3 when at least one portion of the shuttle system has transitioned into the recovery vehicle mode and the operator 5 has to complete a movement within the racking 17 in the recovery vehicle 3.

In the recovery vehicle mode, the car 6 is moved in a vertical position along the frame 4 in which the rails 12 of the second receiving portion 8 are arranged to be substantially aligned or flush with the running rails 19 of the rack level which the operator 5 wants to enter in the recovery vehicle 3. This flush or aligned orientation is provided at the passages 16 and is not apparent in FIGS. 7 and 8 due to the selected perspective.

The rack level is then entered by manually opening the rack-side barrier 9 in the direction of the arrow 21, i.e. backwards from the perspective of the operator 5. Here, the recovery vehicle 3 is moved manually, for example by means of a hand wheel (not shown), by means of which the wheels (not shown) of the recovery vehicle 3 are driven. These wheels (not shown) ensure forward movement on the rails 12 and in particular on the running rails 19 in the rack level.

Opening of the monitored door 10 can bring about a transition into the recovery vehicle mode either alone or additionally with other signals, for example a corresponding request from an operator 5 by actuating a button or lever (not shown). In the embodiment according to FIGS. 1, 2 and 7, an operator 5 can open the sole door 10 assigned to the vertical conveyor 1 and then reach the maintenance platform 15 via the ladder 11. In the embodiment according to FIGS. 5, 6 and 8, an operator 5 can reach the maintenance stages 18 via steps (not shown). A monitored door 10 is assigned to each maintenance stage 18, and when it is opened the operator 5 can bring about a transition into the recovery vehicle mode. By means of the ladder 11 or the steps (not shown), the operator 5 can reach a height required for being able to complete a movement in the recovery vehicle 3 within the racking 17.

By means of a removal opening 13 that is close to the ground, shuttles 2 and optionally also recovery vehicles 3 can be removed from the car 6.

A maintenance platform 15 allows an operator 5 to stop in the upper region of the vertical conveyor 1, if this is necessary. A boom 14 located here makes it possible to lower an injured operator 5 to safety, where necessary. In the variant according to FIGS. 5 and 6, the maintenance stages 18 allow the operator to stop and gain access at various heights along the frame 4 in a convenient manner.

Although only two preferred exemplary embodiments of the disclosure have been described and shown, it is obvious that a person skilled in the art can add numerous modifications without departing from the nature and scope of the disclosure. In particular, the following modifications are conceivable:

The vertical conveyor 1, in particular the car 6, can comprise a bridging device (not shown) in order to bridge a gap (not shown) between the adjacent rack levels (not shown).

The car 6 can comprise a charging device (not shown) for charging a power storage unit of the shuttle 2 or the recovery vehicle 3.

Alternatively or additionally to the rack-side barriers 9, vertical-conveyor-side barriers (not shown) can be provided which are assigned to the car 6. It is also conceivable to completely dispense with potential barriers 9 of this kind.

As shown in FIG. 4, the second receiving portion 8 is preferably arranged above the first receiving portion 7. Alternatively, the second receiving portion 8 can also be arranged below the first receiving portion 7. As also shown in FIG. 4, a second receiving portion 7 requires a very small clear height, to the extent that it is only used to convey unloaded shuttles 2. By contrast, the recovery vehicle 3, which has to allow the operator 5 to climb into the car 6, requires a clear height that is multiple times greater. So that a shuttle 2 that is conveyed by the car 6 and is on a first receiving portion 7 located above the second receiving portion 8 can enter the lowermost rack level, it may be necessary to provide a cavity which the car 6 can enter.

The opening of the door 10 does not necessarily have to bring about a transition into the recovery vehicle mode. The door 10 can be part of an access prevention device, for example a fence, which prevents unauthorized persons from getting too close to the vertical conveyor 1. This kind of fence or the like can protect a removal opening 13 against unauthorized access and can stop unauthorized persons from getting injured. This applies to all the embodiments shown.

If a ladder is arranged outside a region secured by the monitored door 10 instead of the ladder having fall protection 11 according to FIGS. 1 and 2, doors, optionally monitored doors 10, can be provided on multiple levels. This is shown in the embodiment according to FIGS. 5 and 6. For instance, it is ensured that access from steps (not shown in FIGS. 5 and 6) to the vertical conveyor 1 and thus to the car 6 and optionally to the racking 17 cannot be readily provided, or is observed by the monitoring of the doors 10.

The rack-side barrier 9 can also be constructed as an active barrier to which an actuator is assigned. Preferably, when it is constructed as an active barrier, the barrier 9 can also be manually opened where necessary.

The invention claimed is:

1. A shuttle system, comprising:

a racking having a plurality of rack levels, wherein the rack levels comprise guideways for shuttles, at least one shuttle, which can be moved within the rack levels on the guideways, at least one vertical conveyor, which is configured to convey a shuttle or load from a first rack level to a second rack level, at least one recovery vehicle, by means of which an operator can enter a rack level, wherein the vertical conveyor comprises a vertically extending frame and a car that is vertically movable along the frame, wherein the car comprises a first receiving portion for receiving a shuttle or load and a second receiving portion for receiving a recovery vehicle, wherein the car can assume, with regard to at least two rack levels, a transfer position in which the first and/or the second receiving portion is substantially at an adjacent rack level such that a shuttle and/or a recovery vehicle can enter the adjacent rack level from the car or a load can be transferred in this direction, or a shuttle or a recovery vehicle can enter the car from the adjacent rack level or a load can be transferred in this direction.

2. The shuttle system according to claim 1, comprising at least two vertical conveyors and at least two recovery vehicles.

3. The shuttle system according to claim 1, wherein the second receiving portion is arranged above the first receiving portion.

4. The shuttle system according to claim 1, comprising at least one rack-side barrier, which can assume an open and a closed position, wherein the barrier allows a shuttle or a recovery vehicle to enter the first receiving portion of the vertical conveyor from the rack level in the open position when the vertical conveyor is in the transfer position, and wherein the barrier prevents the shuttle or the recovery vehicle from entering in the closed position.

5. The shuttle system according to claim 4, wherein the vertical conveyor comprises an actuation device which can move the barrier from the closed position into the open position and from the open position into the closed position.

6. The shuttle system according to claim 1, comprising a vertical-conveyor-side barrier, which can assume an open and a closed position, wherein the barrier allows a shuttle and/or a recovery vehicle to enter a rack level from a receiving portion of the vertical conveyor in the open position when the vertical conveyor is in the transfer position, and wherein the vertical-conveyor-side barrier prevents the shuttle and/or the recovery vehicle from entering in the closed position.

7. The shuttle system according to claim 1, comprising a vertical-conveyor-side bridging device which bridges a gap that is present in the transfer position between the receiving portion and the adjacent rack level in order to make it possible to transfer the shuttle and/or the recovery vehicle.

8. The shuttle system according to claim 5, comprising a vertical-conveyor-side bridging device which bridges a gap that is present in the transfer position between the receiving portion and the adjacent rack level in order to make it possible to transfer the shuttle and/or the recovery vehicle, wherein the actuation device and the bridging device are part of the same device, or in that the bridging device acts as or comprises the actuation device.

9. The shuttle system according to claim 5, wherein, in the transfer position, the actuation device can move the rack-side barrier from the closed position into the open position and from the open position into the closed position.

10. A method for operating a shuttle system, including a racking having a plurality of rack levels, wherein the rack levels comprise guideways for shuttles; at least one shuttle, which can be moved within the rack levels on the guideways; at least one vertical conveyor, which is configured to convey a shuttle or load from a first rack level to a second rack level; and at least one recovery vehicle, by means of which an operator can enter a rack level;

wherein the vertical conveyor comprises a vertically extending frame and a car that is vertically movable along the frame, wherein the car comprises a first receiving portion for receiving a shuttle or load and a second receiving portion for receiving a recovery vehicle; wherein the car can assume, with regard to at least two rack levels, a transfer position in which the first and/or the second receiving portion is substantially at an adjacent rack level such that a shuttle and/or a recovery vehicle can enter the adjacent rack level from the car or a load can be transferred in this direction, or a shuttle or a recovery vehicle can enter the car from the adjacent rack level or a load can be transferred in this direction; wherein the shuttles move automatically horizontally within the rack levels in a normal operating mode, and can optionally change the rack levels by means of the vertical conveyor; and wherein the vertical conveyor conveys the recovery vehicle into a transfer position in a recovery vehicle mode in order to allow the recovery vehicle to be used in the adjacent rack level.

11. The method according to claim 10, comprising, following a request for a recovery vehicle for a rack level, at least two vertical conveyors convey at least two recovery vehicles to the level of the rack level according to the request.

12. The method according to claim 10, wherein:

the shuttle system is controlled in a substantially automated manner by a warehouse controller in the normal operating mode, and after a transition into the recovery vehicle mode, the warehouse controller optionally initiates processing of all the level changes or at least some of the remaining level changes by means of the vertical conveyor.

13. The method according to claim 10, wherein, after a transition into the recovery vehicle mode, the shuttles of which the power storage unit falls below a certain lower limit and which require a level change or have received a load which requires a level change are moved to a charging station in the level in question, or switch to an energy-saving mode, or carry out another task that does not require any level change.

14. The method according to claim 10, wherein a power storage unit of a shuttle and/or a recovery vehicle in the vertical conveyor can be charged.

* * * * *